(No Model.)

J. R. LITTLE.
PROCESS OF TRUING UP METAL WHEELS.

No. 458,057. Patented Aug. 18, 1891.

Witnesses:
Jas. E. Hutchinson.
Henry C. Hazard.

Inventor.
James R. Little
by Pringle and Russell
his Attorney

UNITED STATES PATENT OFFICE.

JAMES R. LITTLE, OF QUINCY, ILLINOIS, ASSIGNOR TO THE QUINCY METAL WHEEL COMPANY, OF SAME PLACE.

PROCESS OF TRUING UP METAL WHEELS.

SPECIFICATION forming part of Letters Patent No. 458,057, dated August 18, 1891.

Application filed April 22, 1890. Serial No. 348,975. (No model.)

*To all whom it may concern:*

Be it known that I, JAMES R. LITTLE, of Quincy, in the county of Adams, and in the State of Illinois, have invented certain new and useful Improvements in Processes of Truing Up Metal Wheels and Pulleys; and I do hereby declare that the following is a full, clear, and exact description thereof, reference being had to the accompanying drawings, in which—

Figure 1:
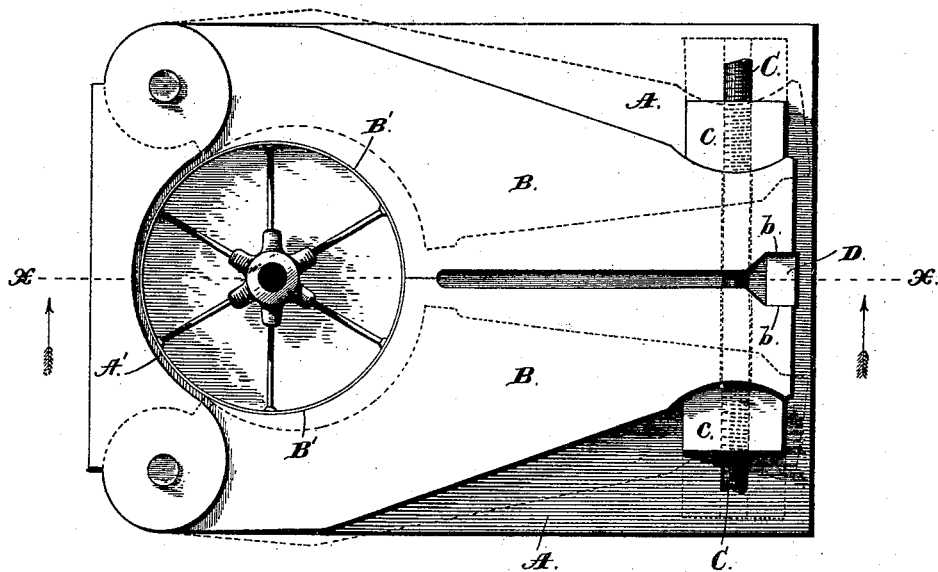
Figure 2:
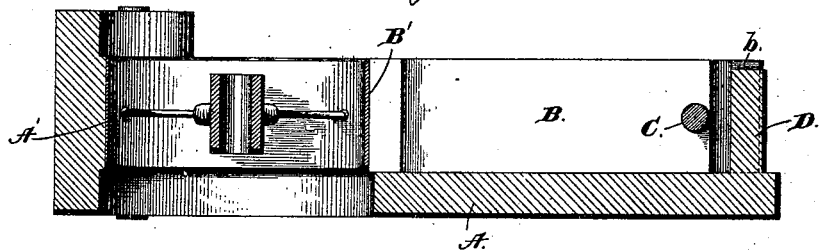

Figure 1 shows a plan view of one form of apparatus which can be used in carrying out my process, and Fig. 2 a view of a section of the same on line $x\ x$ of Fig. 1.

Letters of like name and kind refer to like parts in each of the figures.

The object of my invention is to provide a process by which wrought-metal wheels or pulleys can be made true and perfect in shape; and to this end my invention consists in the process and the parts thereof, as hereinafter specified.

In the manufacture of wrought-metal wheels and pulleys it has been found impossible without a great amount of care and expense to make sure that the wheel or pulley as put together shall always be exactly true and without some imperfections in shape of the outer periphery of its rim. On account of unavoidable imperfections or variations in the material used, or in the workmanship where rapid work and economy in labor are sought after, the wheel or pulley as made is apt to have irregularities or untrue places in its rim, due to warping or springing of the latter during the putting in place of the spokes or to some difference in the length of the latter. Where, for instance, a spoke is even slightly longer or shorter than the adjoining ones the rim will where attached to said spoke be sprung or forced out of the desired true circular curve, so as to stand outside or inside of the curved line of the rest of the rim. The special purpose of my process has been to correct in a simple and economical way all the imperfections in the shape of the wheel or pulley, taking the latter as put together and truing up its periphery, so that it is ready for use without any subsequent turning down or other truing operation.

In carrying out my process, as will be seen by the description to be hereinafter given, I not only upset and shrink the pulley or wheel-rim, so that its periphery has its desired true circular shape, but also correct the differences which may exist in the length of the spokes, so that the rim will permanently retain the shape given it, and will not tend to spring out of shape again.

In the drawings showing one form of rim shaper or upsetter which can be made use of in carrying out my process, A designates a suitable bed-plate or support for the operative parts. Such support has a curved face A' of the proper curvative to engage a portion of the rim of a wheel or pulley of the desired size. As shown, this face is of sufficient extent to engage about one-third of the rim-periphery.

Pivoted to support A, beyond the opposite ends of stationary surface A', are the two levers or jaws B B, having on their inner sides rim-engaging faces B' B', of the same curvature as A' and of such extent as to complete with the latter the inclosure of the pulley or wheel. As shown, each jaw-face is of the same extent as the stationary one, so as to engage a third of the rim of the desired wheel or pulley. While I prefer this arrangement, it is not necessary and can be departed from without departure from my invention. Whatever the relative extent of the curved faces on the bed and jaws may be, they should be adapted to form together a perfect circle of the diameter of the periphery of the wheel or pulley to be produced. The outer ends of the jaws are to be provided with suitable means for forcing them toward each other, so as to bring the respective curved faces B' B' into the same circle with the face A'. For this purpose a right and left hand screw C, with nuts $c\ c$ on the outer sides of the jaws, can be used. In order that the jaws when moved toward each other may be stopped in their proper positions, I provide the stop lug or block D, fixed on the bed A in position to be engaged by bearing-surfaces $b\ b$ on the inner sides of the outer ends of the jaws.

The nuts can be attached to or made separate from the respective jaw-levers. In the former case the screw can be turned by any desired means, so as to carry the nuts, and consequently the jaw-levers, toward or from each other to clamp or release a wheel. Where the nuts are made capable of being turned, the screw can be held from rotation in any desired way and the nuts can be screwed in or out upon it.

If with the apparatus described, or with any other mechanism having a circular cavity or opening of the true diameter of the wheel or pulley rim, the wheel or pulley be forced into or clamped in the opening, the rim will take a circular shape. Any low or flat portion will be forced out, so as to conform to the walls of the inclosing cavity, and any bulging or projecting portions will be forced inward into the same circle with the rest of the periphery. The reason why a low or flat portion of the rim will be forced out as the latter is compressed in the circular inclosing cavity is apparent. Obviously, as any portion of the curved rim must be longer than its chord or the straight line between its extremities, any distortion of the curve of the rim which would lessen the curvature of a part of the latter or make it approach a straight line must necessarily cause the ends of the part to be spread apart, with a consequent forcing outward of the portions of the rim adjoining such ends. Subsequent compression of the wheel-rim within a circular inclosing cavity to bring its periphery into a true circle will, by the forcing inward of the spread portions of the rim adjoining the depressed or untrue part, cause such part to bend outward against the walls of the cavity, so that it will have its proper curved position again. Unless the wheel-rim is so very defective that it has some portion bent in beyond a straight line joining its ends, there will be no danger of inward buckling of the rim during compression, and the outward bending will take place with considerable force. Where the depression or flattening of the rim is caused by a short spoke, the latter will, by the forcing outward of the flat or depressed rim portion, as described above, be stretched or lengthened, so as to be of the same length as the other spokes. On the other hand, any spoke which is too long will be upset and shortened to agree with the rest in length.

To insure the best results and effectually prevent any tendency of a wheel or pulley to spring out of shape again after it has been released from the upsetter and shaper, I heat all spokes at once while the wheel-rim is still held in the shaping cavity or opening. This heating is done at any convenient point between the hub and rim by any suitable kind of furnace or heating device.

As the form and construction of the means for heating the spokes can be varied as desired without departure from my invention, I need not describe the same specifically or show it in the drawings.

Whatever the kind of heater used may be, it is preferably one adapted to apply heat to all the spokes at once. As the heat is applied to the spokes while the wheel or pulley rim is clamped in the circular opening or cavity, any short spoke or spokes will be lengthened or drawn out by the outward forcing of the attached portion of the rim, so as to exactly equal the others in length, while any long spoke will be upset or shortened longitudinally. The result will be that the wheel or pulley rim will be upset or shaped so that the curve of its periphery will be a true circle, and the spokes will all be of equal length. If, then, the spokes be allowed to cool before the wheel or pulley is removed from the clamping device or the pressure taken off of the rim, the true shape given the latter will be retained and there can be no subsequent springing back to its irregular shape again.

It will be observed that my process, as described, is essentially different from the ordinary method of shrinking tires upon wooden wheels or of reducing the rim for a metal wheel to a certain size before the wheel is made and without regard to the truth of the periphery of the rim after the wheel is put together. According to my invention, I take the wheels or pulleys after the spokes have been attached to the rim and true them up, permanently correcting any variations or imperfections in shape. By my process, which is a simple one and capable of being quickly carried out, I have found that I can secure a great saving in the time, labor, and expense of producing wrought metal wheels or pulleys true in shape, for my invention renders it no longer necessary, during the process of manufacture, to exercise great care and spend much time in the attempt to make the wheel or pulley with rim true and exact in shape and spokes precisely equal in length. The manufacture can be carried on more rapidly and more economically both as to time and expense, while by the use of my process the wheels and pulleys produced are made truer in shape than has heretofore been possible.

Having thus described my invention, what I claim is—

1. The process of producing wrought-metal wheels and pulleys true in shape, which consists in fastening the rim and spokes together, then compressing the rim in a recess or cavity adapted to give the rim-periphery the desired shape, heating the spokes between the rim and hub, and then allowing the spokes to cool before the wheel or pulley rim is released from the cavity, substantially as and for the purpose described.

2. The process of producing wrought metal wheels and pulleys true in shape, which consists in compressing the wheel or pulley in a circular recess whose diameter is the true diameter of the wheel or pulley rim, then heating the spokes between the rim and hub, and allowing them to cool before releasing the rim from the inclosing cavity or recess, substantially as and for the purpose specified.

3. The method of truing up metal wheels or pulleys, which consists in compressing the wheel or pulley rim in a circular cavity whose diameter is the true diameter of the rim, and heating the spokes between the hub and rim, substantially as and for the purpose shown.

In testimony that I claim the foregoing I have hereunto set my hand this 31st day of March, 1890.

JAMES R. LITTLE.

Witnesses:
  OSCAR P. BONNEY,
  JAMES M. THOMAS.